Nov. 3, 1964  G. P. GIBSON ETAL  3,155,878
PROTECTOR FOR DYNAMOELECTRIC MACHINES
Original Filed Jan. 20, 1958  2 Sheets-Sheet 1

WITNESSES:
Bernard R. Gieguey
James F. Young

INVENTORS
Gordon P. Gibson &
Joseph G. Schwarckopf
BY E. H. Liss
ATTORNEY

United States Patent Office 3,155,878
Patented Nov. 3, 1964

3,155,878
PROTECTOR FOR DYNAMOELECTRIC MACHINES
Gordon P. Gibson, Orchard Park, and Joseph G. Schwarckopf, Eggertsville, N.Y., assignors to Westinghouse Electric Corporation, East Pittsburgh, Pa., a corporation of Pennsylvania
Original application Jan. 20, 1958, Ser. No. 710,111. Divided and this application May 1, 1961, Ser. No. 106,841
11 Claims. (Cl. 317—13)

The present invention relates to over-temperature protection for dynamoelectric machines, and more particularly to inherent thermal protection of dynamoelectric machines wherein the over-temperature detecting means is adapted to be embedded directly in the winding.

This application is a division of our prior application Serial No. 710,111, filed January 20, 1958, which has been replaced by a continuation application Serial No. 106,842, filed May 1, 1961, now Patent No. 3,079,524, issued February 26, 1963.

Dynamoelectric machines have usually been protected against overheating by means of thermal overload relays having a thermally responsive element, usually a bimetallic element, heated either directly by the current of the protected machine, or by a heater carrying the current, so that the relay responds solely to the current. Relays of this type do not give entirely satisfactory or adequate protection, however, since the relay responds only to the current, and the thermal characteristics of the relay do not, and obviously cannot, match those of the motor, so that the thermal response of the relay differs from that of the motor. Thus, the relay is affected differently from the motor by changes in the ambient temperature, and the response of the relay may also be affected by heat from other adjacent devices, or by air currents and similar conditions which do not affect the motor.

At present, nearly all overload relays have the same defect. They are designed to give an action in response to a signal generated as a result of some phenomenon occurring outside the motor they are supposed to protect. Some development work has been carried out to modify existing types of overload relays in an attempt to offer adequate overload protection. In all motor installations a major problem is to prevent internal damage to the winding due to excessive heat. Therefore, it is desired to provide an inherent overload device that will be activated by the heat of the motor winding.

Inherent thermal protection has been developed which comprises a tube containing an expansible, vaporizable liquid and is arranged to be heated by direct conduction of heat from the machine windings. This type of relay which responds directly to the motor temperature may not operate rapidly enough to follow the temperature as closely as desired. Furthermore, the physical structure is such that temperature detecting means cannot be located precisely at the desired area in the windings.

The known relays, therefore, are not satisfactory since it is not possible to obtain sufficiently close protection and in some circumstances the relay will operate when the motor is still below the maximum safe temperature, so that it is unnecessarily stopped, while under other circumstances, the relay may allow the motor to become overheated before it operates.

The principal object of the present invention is to provide inherent thermal protection for dynamoelectric machines which is rapid, accurate in operation, fail safe, and which uses a relatively simple and inexpensive thermally responsive device.

It is an object of the invention to provide electrical apparatus with thermal protection using a thermistor having a small change in resistance with changes in normal temperatures and a large change in resistance for a relatively small change in temperature when abnormal temperatures are encountered. This has the advantage that sensitive and expensive control devices are not required to operate in response to the change in resistance, and a simple inexpensive control relay may be used. Preferably, the thermistor is of the positive temperature coefficent type since this gives advantages in providing a fail safe control circuit.

Another object of the invention is to provide inherent thermal protection for dynamoelectric machines using a relatively simple and inexpensive thermally responsive device which is rapid and accurate in operation, fail safe, and which is operated by direct conduction of heat from the winding to be protected.

A further object of the invention is to provide inherent thermal protection for dynamoelectric machines comprising a temperature sensitive resistance element which is embedded directly in the machine windings and is heated by direct conduction of heat from the windings.

Other objects and advantages of the invention will be apparent from the following detailed description taken in connection with the accompanying drawings, in which.

Figure 1:
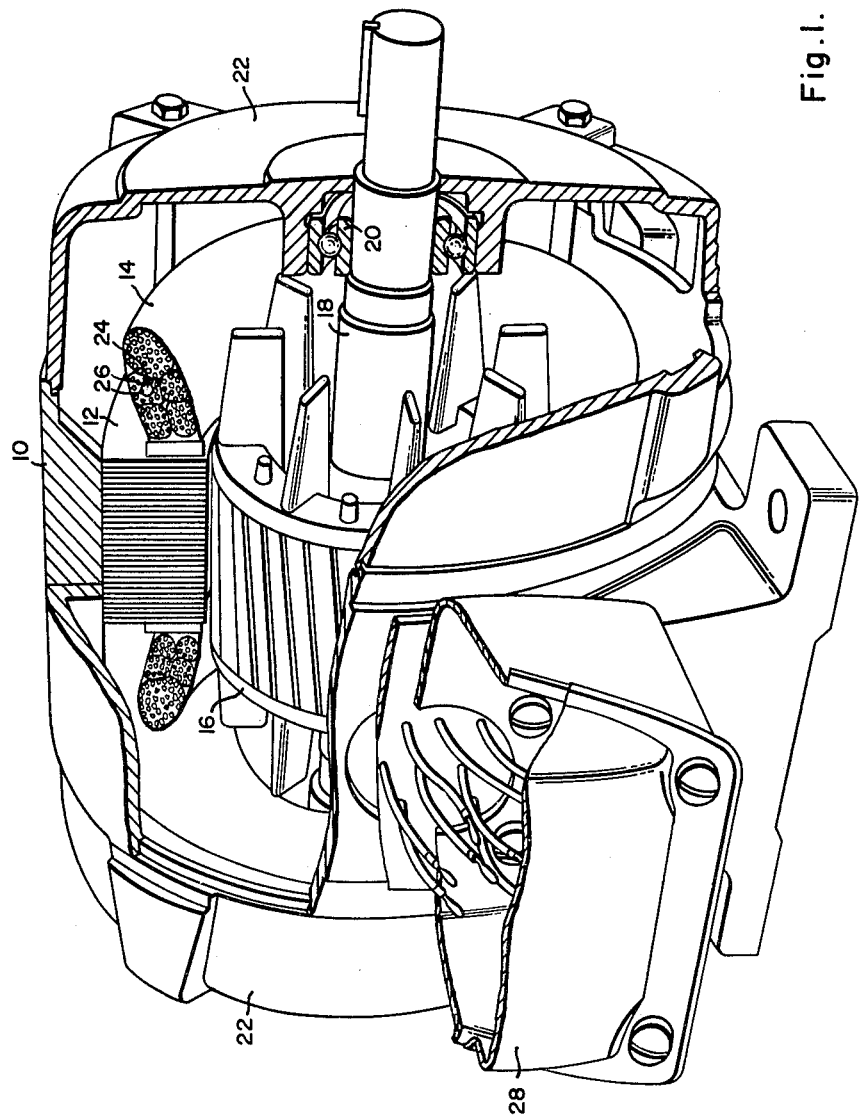
FIGURE 1 is a perspective view, partly broken away, showing a thermally protected machine.

FIG. 1 shows a thermally protected electric motor embodying the invention. An alternating current induction motor has been shown for the purpose of illustration, but it will be understood that the protective means is generally applicable to dynamoelectric machines of any type. The motor shown in FIG. 1 includes a frame structure 10 in which is supported a stator core 12 with windwindings 14 disposed in slots in the core in the usual manner, with the end turns of the windings extending beyond the core. The motor also has a rotor 16 mounted on a shaft 18 supported for rotation in bearings 20 carried in suitable end brackets 22. Shown embedded in the end extension of winding 14 is a temperature responsive resistance element 24 having a pair of leads 26 which may be brought out to junction box 28 if desired for connection with the remainder of the protective circuit. The resistance element 24 is a heat sensitive semiconductor device which changes its resistance rapidly with change in temperature. It may have a negative temperature coefficient of resistance, such that its resistance decreases cumulatively 5% for each 1° C. rise in temperature. Thus, when such a thermistor is mounted in the windings of a motor, its resistance will decrease as the winding temperature increases and it can be incorporated in a control circuit, such that at a given excessive temperature of the motor windings, it will cause the contactor to open through which power is supplied to the motor, thus protecting the motor. The control can be made so that the motor will cycle and start up again when the temperature has dropped to a predetermined safe value, or it can be made to lock out the circuit requiring manual restarting. However, it may often be deemed preferable that the temperature sensitive resistance element be a semiconductor device which has a positive coefficient of resistance, such that its resistance increases rapidly with rise in temperature. The embodiments of the invention shown in FIGS. 2 and 3 incorporate a thermistor having a negative temperature coefficient of resistance, while embodimetns utilizing thermistors with a positive temperature coefficient of resistance are disclosed and claimed in the above-mentioned parent application.

Thermistors and other thermal sensitive resistance elements are built in various sizes, but the ones that are preferred for use in this invention are of the order of .25 inch diameter and .0625 inch in length with a small size lead wire brought out at each end. Being so very small, these resistors can easily be located in the windings of a motor, so that they can fairly closely follow the temperature cycle of the copper with the heat being transmitted through the conductor insulation to the thermistor, and the conductor insulation also insulating the thermistor from the motor voltage.

Figure 2:
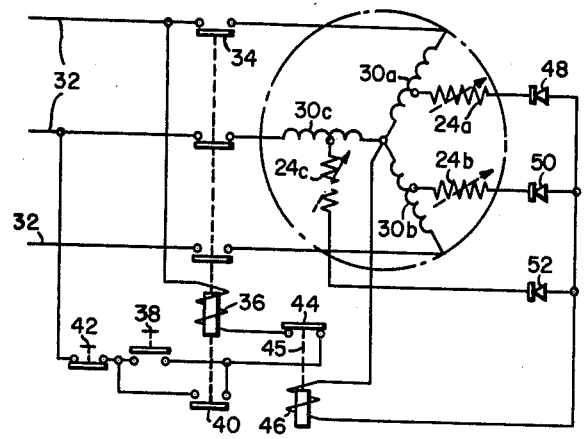
FIG. 2 is a schematic diagram showing the thermally responsive device connected to a three-phase motor.

FIG. 2 shows the manner in which one embodiment of the protective device is electrically connected for use in the stator windings of a three-phase induction motor. Thermistor device 24 comprises three individual thermistor units 24a, 24b and 24c connected in parallel. Each of the thermistor units is embedded in a phase winding of the motor as shown in FIG. 1, or otherwise mounted on the winding in close thermal relation thereto. This embodiment shows a three-phase motor having phase windings 30a, 30b and 30c connected to a three-phase line 32 by means of a contactor 34 of any suitable type. As shown in the drawing, the contactor 34 is actuated by a coil 36 connected across one phase of the line 32 and controlled by a start pushbutton 38 which energizes the coil 36. This closes the three-pole contactor 34, the contactor being held in by a sealing contact 40. The motor is stopped by actuation of the stop pushbutton 42 or by opening of a pair of contacts 44 of relay 45 the operation of which will be explained hereinafter. Either of these means interrupts the circuit of the coil 36 and allows the contactor 34 to open. Except for the contacts 44 this is a conventional line starter.

Contacts 44 of relay 45 are normally closed and are actuated to an open position by energization of the coil 46. Relay coil 46 is connected in a circuit made up of the three thermistors 24a, 24b and 24c, each connected in series with a small rectifier and connected to the stator winding to get a balanced three-phase power supply. Thermistor 24a is tapped into the phase winding 30a of the stator of the motor, thermistor 24b is tapped into the phase winding 30b and thermistor 24c is tapped into the phase winding 30c. The coil 46 is connected at one end to the rectifier 48, 50 and 52 and at its other end to the junction of the phase windings 30a, 30b and 30c. The thermistors are small as pointed out hereinabove and are embedded in the stator windings as shown at 24 in FIG. 1. The resistance of the thermistors is selected so that it decreases upon heating to a value which permits sufficient current to flow to actuate the relay 45. Actuation of the relay 45 opens the line starter by deenergizing the coil 36. The line contactor 34 opens, removing power from the motor. Proper selection of thermistor resistance and relay coil turns makes it possible to secure protection against any desired temperature. The thermal capacity of the thermistors is so small that protection is secured against overheating from any cause including locked rotor, single phasing, overload, loss of cooling and excessive ambient temperature.

It will be seen that the motor will be stopped upon heating of the thermistors 24 to a predetermined maximum safe temperature by direct conduction of heat from the winding. Complete protection is obtained in this way under all conditions. Thus, heating due to an overload causes the winding temperature to rise and heat the thermistors 24 directly. Stalled or locked rotor conditions cause excessive currents and consequently excessive heating in the winding which heat is conducted to the thermistors and heats them rapidly enough to cause operation in time to protect the motor. Protection is also obtained against single-phase operation of the motor. Such operation may be caused by interruption of one of the lines 32 external to the motor which will result in the motor running as a single-phase motor with two of the phase windings in series across the remaining two lines with excessive current. Single-phase operation may also result from blowing of the fuse on the primary side of a three-phase transformer supplying the motor. Current will then flow through two of the phase windings in parallel and return through the third phase which will thus be carrying an excessive current and consequently overheat.

The thermistors in the embodiment illustrated in FIG. 2 preferably have a negative temperature coefficient of resistance; thus the resistance decreases with the increase of temperature in the thermistors. Because electrical energy for relay 45 in the protective scheme shown in FIG. 2 is supplied by tapping directly into the motor winding, it is necessary that the protective scheme be built into the motor during original assembly. It may be desirable under certain circumstances to provide a scheme which could be employed as an added feature in an existing motor. Such a scheme is shown in the embodiment illustrated in FIG. 3. The FIG. 3 embodiment again discloses the protective scheme employed in a three-phase motor. It will, of course, be understood that this protective scheme may be used in other types of dynamoelectric machines, if desired.

Figure 3:
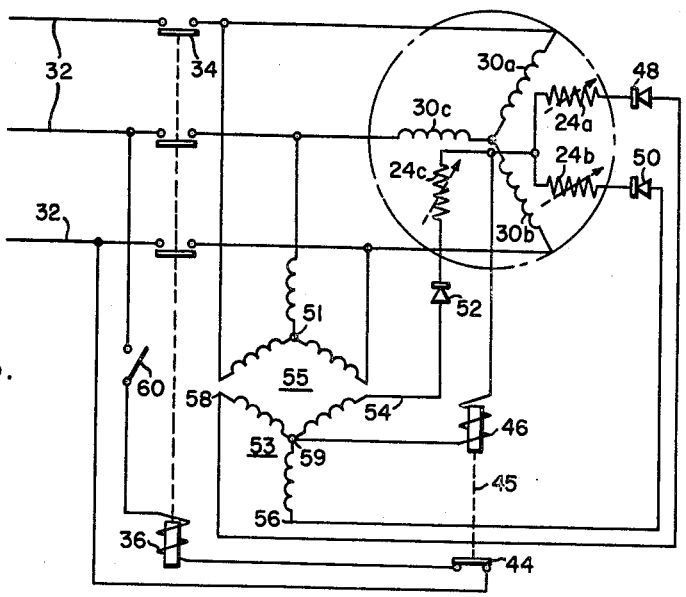
FIG. 3 is a schematic diagram showing another modification of the invention incorporated in a three-phase motor wherein the device has a different form of power supply than the FIG. 2 modification.

In the FIG. 3 embodiment, thermistors 24a, 24b and 24c are shown, each embedded in one phase winding 30a, 30b and 30c of the motor stator. In series with each of the thermistors 24a 24b and 24c is a small rectifier 48, 50 and 52, respectively. The rectifiers are each connected to one terminal on the secondary 53 of a small three-phase transformer 55 as shown at 54, 56 and 58. The primary of the transformer is connected to line 32 on the motor side of contactor 34. At the end remote from the rectifiers 48, 50 and 52, thermistors 24a, 24b and 24c are connected together and to one side of actuating coil 46 of relay 45. At its other side coil 46 is connected to the neutral 59 of the secondary of transformer 55. Contacts 44 of relay 45 are normally closed; however, when the temperature of the motor windings, due to an excessive overload or due to trouble in the motor, rises to an unsafe value, the thermistors will also increase in temperature and decrease in resistance to a value that will let enough current flow through one or more of them to energize the relay coil and thus open its contacts. The contacts 44 of the relay 45 may be connected in the control circuit of a motor in any desired manner. As shown in the drawing, the contactor 34 is actuated by a coil 36 connected across one phase of the line 32 and controlled by a manual switch 60. The motor is started by closing the switch 60 which energizes the coil 36 and closes the contactor 34. The motor is stopped by opening of the switch 60 or by opening of the contacts 44 of the protective device disclosed, either of which interrupts the circuit of the coil 36 and allows contactor 34 to open. It will thus be seen that the motor will be stopped upon heating of the thermistors 24 to the predetermined maximum safe temperature by direct conduction of heat from the windings.

It should now be apparent that inherent thermal protection has been provided by means of a relatively simple and inexpensive thermally responsive relay which is applicable to any type of dynamoelectric machine including polyphase or single-phase motors, alternating current or direct current motors or generators, or to any type of electrical device having current carrying windings which may be subject to overheating. Thermally responsive elements are readily applied to the windings and may be put in place before the final varnish impregnation and baking of the winding, if desired, so that the varnish helps to hold them in place and in good thermal relation with the windings. They may also be added as an additional feature to an existing motor.

In the embodiments of the invention shown in FIGS.

2 and 3, when the machine windings are carrying current below a predetermined overload value, the thermistor 24 is relatively cool and offers a relatively high resistance to the flow of energizing current. This high resistance blocks the flow of energizing current through the electrical circuit including the winding of relay 45 and thermal responsive elements 24; however, when the windings carry current equal to or in excess of a predetermined overload current for said machine, the windings heat up and the resistance of the thermistor drops thereby allowing sufficient current to pass through the energizing winding of relay 45 to open the relay so as to disconnect the motor from an energizing source of power. In the parent application hereinbefore mentioned, other embodiments are disclosed in which thermistors having a positive temperature coefficient are utilized so that the resistance increases upon overheating of the windings and the current to a normally energized relay is reduced. It will be apparent that, in certain of its broader aspects, the present invention is also applicable to these arrangements.

Certain preferred embodiments of the invention have been shown and described for the purpose of illustration but since various other embodiments and modifications are possible within the scope of the invention, it is to be understood that the invention is not limited to the specific details or construction shown but in its broadest aspect it incudes all equivalent embodiments and modifications.

We claim as our invention:

1. An alternating-current electrical apparatus including a frame structure, a winding thereon, a main switching device for connecting said winding to an alternating-current line and causing alternating current to flow in the winding, insulation for said winding susceptible to overheating under abnormal conditions and having a predetermined temperature above which it is desired that it should not be heated, one or more temperature sensitive resistances mounted in the apparatus and subjected to the heating of said winding and insulation, a single direct-current operated control device directly controlling the operation of said main switching device, a control circuit for said control device, means for energizing said control circuit from the alternating-current line through said main switching device, said one or more temperature sensitive resistances being connected in said control circuit and determining the magnitude of the current flow therein solely in response to temperature, said control circuit and one or more temperature sensitive resistances being energized only when the main switching device has been operated to cause alternating current to flow to said winding, and one or more rectifiers in said control circuit and supplying both said one or more temperature sensitive resistances and said control device with direct current which varies with the temperature of said winding and insulation to cause operation of said control device and said main switching device to deenergize the winding when said predetermined temperature is approached.

2. An alternating-current electrical apparatus including a frame structure, a winding thereon, a main electromagnetic contactor having a coil which when energized causes the contactor to connect said winding to an alternating-current line and cause alternating current to flow in the winding, insulation for said winding susceptible to overheating under abnormal conditions and having a predetermined temperature above which it is desired that it should not be heated, one or more temperature sensitive resistances mounted in the apparatus and subjected to the heating of said winding and insulation, a direct-current operated control relay having contacts in series with the coil of said main contactor and controlling the operation thereof, a control circuit for said control relay, means for energizing said control circuit from the alternating-current line through said main contactor, said one or more temperature sensitive resistances being connected in series with said control circuit of the relay and determining the magnitude of the current flow therein, said control circuit of the relay and said one or more temperature sensitive resistances being energized only when the main contactor has been operated to cause alternating current to flow to said winding, and one or more rectifiers in circuit with and supplying both said one or more temperature sensitive resistances and said control circuit of the control relay with direct current which varies with the temperature of said winding and insulation to cause operation of said control relay and said main contactor to denergize the winding when said predetermined temperature is approached.

3. An alternating-current electrical apparatus including a frame structure, a winding thereon, a main switching device for connecting said winding to an alternating-current line and causing alternating current to flow in the winding, insulation for said winding susceptible to overheating under abnormal conditions and having a predetermined temperature above which it is desired that it should not be heated, one or more temperature sensitive resistances mounted in the apparatus and subjected to the heating of said winding and insulation, a control relay having a direct-current operated coil for controlling the operation of said main switching device, a control transformer having a primary energized from the alternating-current line and a secondary having at least two winding parts and a mid-connection therebetween connected to the coil of the control relay, said transformer, control relay coil and one or more temperature sensitive resistances being energized only when the main switching device has been operated to cause alternating current to flow to said winding, and one or more rectifiers in circuit with said secondary and causing direct current to flow in both said one or more temperature sensitive resistances and said control relay coil, said direct current varying with the temperature of said winding and insulation to cause operation of said control relay and said main switching device to deenergize the winding when said predetermined temperature is approached.

4. An alternating-current electrical apparatus including a frame structure, a winding thereon, a main switching device for connecting said winding to an alternating-current line and causing alternating current to flow in the winding, insulation for said winding susceptible to overheating under abnormal conditions and having a predetermined temperature above which it is desired that it should not be heated, one or more temperature sensitive resistances mounted in the apparatus and subjected to the heating of said winding and insulation, a control relay having a direct-current operated coil for controlling the operation of said main switching device, a control transformer having a primary energized from the alternating-current line and a secondary having at least two winding parts and a mid-connection therebetween, a control circuit comprising a plurality of conductors extending from the secondary of said transformer and energizing said temperature sensitive resistances, one of said conductors being connected to the mid-connection of the transformer secondary and having the coil of the control relay in series therewith, a rectifier in series with each of the other conductors of the control circuit connected to the secondary of the transformer and causing unidirectional current to flow through said control relay coil and mid-connection, said transformer having its primary energized from the alternating-current line only when said main switching device is operated to energize said line.

5. An alternating-current electrical apparatus including a frame structure, a winding thereon, a main switching device for connecting said winding to an alternating-current line and causing alternating current to flow in the winding, insulation for said winding susceptible to overheating under abnormal conditions and having a predetermined temperature above which it is desired that it should not be heated, one or more temperature sensitive resistances mounted in the apparatus and subjected to the heating of said winding and insulation, a control relay having a direct-current operated coil for controlling the operation of said main switching device, a control transformer having a primary energized from the alternating-current line and a secondary having at least two winding parts and a mid-connection therebetween, a control circuit comprising a plurality of conductors extending from the secondary of said transformer and energizing said temperature sensitive resistances, one of said conductors being connected to the mid-connection of the transformer secondary and having the coil of the control relay in series therewith, a rectifier in series with each of the other conductors of the control circuit connected to the secondary of the transformer and causing unidirectional current to flow through said control relay coil and mid-connection.

6. An alternating-current electrical apparatus including a frame structure, a polyphase winding thereon, a main switching device for connecting said winding to an alternating current line and causing alternating current to flow in the winding, insulation for said winding susceptible to overheating under abnormal conditions and having a predetermined temperature above which is is desired that it should not be heated, a plurality of thermistors mounted in the apparatus and connected to a common point at one end, each of said thermistors being subjected to the heating of a phase of said winding and insulation, a control relay having a direct current operated coil for controlling the operation of said main switching device, a control transformer having a primary energized from the alternating current line and a secondary having at least two winding parts and a mid-connection therebetween, a control circuit comprising a plurality of conductors extending from the secondary of said transformer and energizing said thermistors, one of said conductors being connected to the mid-connection of the transformer secondary at one end and to said common point through the coil of the control relay at its other end, a rectifier in series with each of the other conductors of the control circuit connected to the secondary of the transformer and causing unidirectional current to flow through said control relay coil and mid-connection, said transformer having its primary energized from the alternating current line only when said main switching device is operated to energize said line.

7. An alternating-current electrical apparatus including a frame structure, a polyphase winding thereon, a main switching device for connecting said winding to an alternating current line and causing alternating current to flow in the winding, insulation for said winding susceptible to overheating under abnormal conditions and having a predetermined temperature above which it is desired that it should not be heated, a plurality of thermistors mounted in the apparatus and connected to a common point at one end, each of said thermistors being subjected to the heating of a phase of said winding and insulation, a control relay having a direct current operated coil for controlling the operation of said main switching device, a control transformer having a primary energized from the alternating current line and a secondary having at least two winding parts and a mid-connection therebetween, a control circuit comprising a plurality of conductors extending from the secondary of said transformer and energizing said thermistors, one of said conductors being connected to the mid-connection of the transformer secondary at one end and to said common point through the coil of the control relay at its other end, a rectifier in series with each of the other conductors of the control circuit connected to the secondary of the transformer and causing unidirectional current to flow through said control relay coil and mid-connection.

8. An alternating-current electrical apparatus including a frame structure, a polyphase winding thereon, a main switching device for connecting said winding to an alternating-current line and causing alternating current to flow in the winding, insulation for said winding susceptible to overheating under abnormal conditions and having a predetermined temperature above which it is desired that it should not be heated, a plurality of thermistors mounted in the apparatus and connected together at a common point at one side, said thermistors being subjected to the heating of said winding and insulation, a single direct current operated control device directly controlling the operation of said main switching device, said thermistors being connected in said control circuit and determining the magnitude of the current flow therein solely in response to temperature, said control circuit and said thermistors being energized only when the main switching device has been operated to cause alternating current to flow to said winding, and one or more rectifiers in said control circuit supplying both said thermistors and said control device with direct current which varies with the temperature of said winding and insulation to cause operation of said control device and said main switching device to deenergize the winding when said predetermined temperature is approached.

9. An electrical apparatus including a current carrying winding, a main contactor for connecting said winding to a supply line, a coil for actuating said main contactor, a starting switch connected in series with said coil, connections for energizing said coil through the starting switch from said supply line ahead of the main contactor, one or more thermistors subjected to the heating of said current carrying winding, a device having two conditions connected in circuit with said one or more thermistors and operable to change from one condition to another upon predetermined heating of said one or more thermistors, connections energizing said thermistors and said device from said supply line at the side of the main contactor opposite to the side from which said coil is energized through the starting switch, and said one or more thermistors and said device being deenergized by said main contactor when it is opened and being energized by said main contactor when it is closed.

10. An alternating current electrical apparatus as defined in claim 1 in which said temperature sensitive resistances are connected to said winding to be energized thereby.

11. An alternating current electrical apparatus as defined in claim 1 in which the winding is a polyphase winding and each of said temperature sensitive resistances is connected to one phase of said winding at an intermediate point thereof.

References Cited in the file of this patent
FOREIGN PATENTS
735,755   Great Britain _____ Aug. 31, 1955